July 21, 1953 B. C. KING, JR 2,646,545
AMPLITUDE LINEARITY MEASUREMENT
Filed June 26, 1951

INVENTOR
BARRY C. KING, JR.
BY Morris Liebkin
ATTORNEY

Patented July 21, 1953

2,646,545

UNITED STATES PATENT OFFICE 2,646,545

AMPLITUDE LINEARITY MEASUREMENT

Barry C. King, Jr., Collingswood, N. J., assignor to Radio Corporation of America, a corporation of Delaware Application June 26, 1951, Serial No. 233,658

6 Claims. (Cl. 324—57)

This invention relates to improvements in apparatus for testing electrical amplifiers, and particularly to an improved apparatus for checking amplifier linearity.

As used herein, the term "linearity" is intended to mean the relative response of an amplifier to signals of different amplitude. As is well known, nonlinearity (i. e. different relative response to input signals of different amplitude) gives rise to distortion effects that may be more or less objectionable depending on the use for which the amplifier being tested was designed.

Perhaps the most common method of checking amplifier linearity involves the use of a sinusoidal input wave, with the amplifier output being examined with a wave analyzer to determine what harmonic or other distortion components are developed in the amplifier due to nonlinearity therein. Another known method of checking or testing for nonlinearity is the so-called intermodulation method, involving the use of two testing signals of different frequencies. This method also requires frequency analysis of the output wave. Both of the methods briefly outlined above are relatively complicated. Furthermore, neither gives a direct indication of the input signal levels for which there are deviations in the amplifier response.

It is a general object of the present invention to provide an improved apparatus for checking amplifier linearity.

A more specific object of the invention is to provide a simple and efficient apparatus for obtaining a direct indication of the response of an amplifier to different amplitude input signals.

In accordance with the invention, the foregoing and other related objects and advantages are attained in an apparatus wherein a "step" or "staircase" shape wave is generated as a testing signal to be applied to the input of an amplifier being tested. At the output of the amplifier, the amplified step-wave is differentiated to obtain pulses corresponding to and of amplitude determined by the height of each step in the wave. By examining the relative amplitudes of these pulses, it is possible to determine the effect of the tested amplifier on each step in the wave.

A more complete understanding of the invention can be had by reference to the following description of illustrative embodiments thereof, when considered in connection with the accompanying drawing, wherein.

Figure 1:
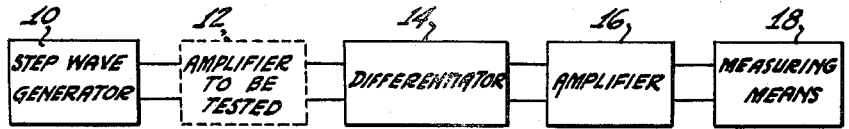
Fig. 1 is a block diagram showing the basic elements of an amplifier testing apparatus arranged in accordance with the invention.
Figure 3:
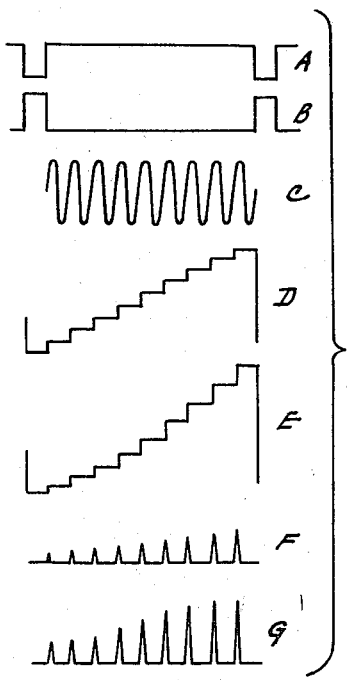
Fig. 3 shows certain of the voltage waveforms appearing in the systems of Figs. 1 and 2.

As shown in Fig. 1, an apparatus arranged in accordance with the invention comprises a stepwave generator 10 providing a repetitive step or staircase wave shape voltage, such as shown in Fig. 3, line D, adapted to be applied to the input of an amplifier 12 to be tested. In the usual case, the step heights would be made as nearly equal as possible, although inequalities in step height can be accounted for in calibration. At the output of the amplifier 12, the step wave will be reproduced in amplified form. The amplified wave may have some variation between heights of the individual steps thereof due to nonlinearity in the amplifier being tested. Thus, for example, as shown in Fig. 3, line E, of the drawing, the first few steps in the amplified stepwave may be compressed as compared with the last few steps thereof. Such variations in step height would indicate nonlinearity or nonuniform response of the amplifier 12 to the input signals of different amplitude.

It might appear that the amplified stepwave could be examined with an oscilloscope or similar waveshape delineator to obtain the desired information about the characteristics of the amplifier 12. While this is true, observation of the stepwave would involve certain limitations. Perhaps the most important of these limitations is that the stepwave amplitude would be limited by the available viewing space on the oscilloscope or other examining instrument. Therefore, variations between the amplitudes of individual steps in the wave might be difficult to detect.

In accordance with the invention, evaluation of the waveform is facilitated by applying the wave from the output of the amplifier 12 to a differentiator circuit 14. The purpose of the differentiator 14 is to provide a plurality of pulses, each of which corresponds to one of the steps in the stepwave, as shown in Fig. 3, line F.

It can be seen that the individual pulses all can be amplified for observation to an amount such that the highest amplitude pulse is comparable in amplitude to the overall height of the stepwave. Obviously, this considerably facilitates examination of the effect of the amplifier 12 on each step of the input wave form, since each pulse is far greater in amplitude than the individual steps in the wave form could be if examined in the step wave itself. That is, it becomes possible to use an amplifier 16 to "blow up" the individual pulses as obtained from the differentiator circuit 14, thereby providing large amplitude pulses, as shown in Fig. 3, line G, in which pulse differences (and, hence, differences in step height) will be readily detectable.

The relative heights of the amplified pulses can be measured in a number of different ways, depending on the type of information that is required in any given case. For example, as shown in more detail hereinafter, the measuring means 18 may comprise a cathode ray oscilloscope or similar waveform delineator which will permit examination of the individual pulses to determine precisely what signal amplitudes are discriminated against or over-amplified in the amplifier being tested. On the other hand, an apparatus of the type shown in Fig. 1 can be used in production testing to determine whether or not amplifiers being manufactured come within predetermined tolerances as to linearity. In this case, the measuring means 18 may comprise a circuit adapted to indicate whether pulses in a pulse train are greater or less than a predetermined amplitude. A circuit of this type is shown, for example, in the copending application of H. H. Wittenberg, Serial No. 130,051, filed November 29, 1949, and assigned to the assignee of the present invention. A circuit of the type described in the Wittenberg application would not require any analytical ability on the part of the individual making the test, but could be set up merely to indicate whether or not a particular amplifier is "acceptable" or "unacceptable." Rejected amplifiers then could be examined individually with an oscilloscope or similar pulse portrayal device to determine where the fault lies.

Figure 2:
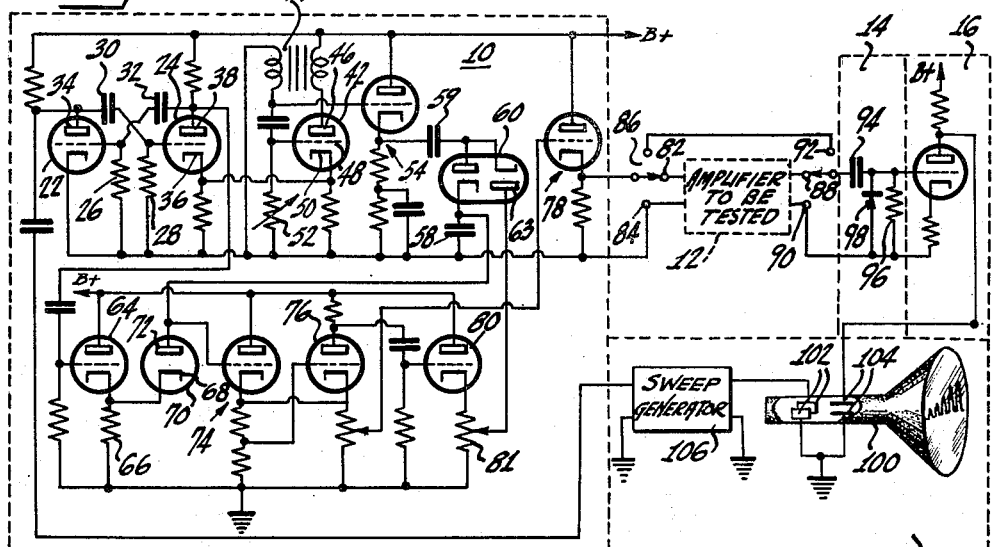
Fig. 2 is a schematic diagram showing typical circuits suitable for use in an apparatus of the type shown in Fig. 1.

For the sake of concreteness, there is shown in Fig. 2 the schematic diagram for an apparatus of the type shown in general form in Fig. 1.

In the circuit of Fig. 2, a step wave generator 10 comprises an unsymmetrical multivibrator circuit, including a pair of cross-connected tubes 22, 24. As is well known, a multivibrator circuit operates in such fashion that an increase in current through one tube causes a decrease in the current through the other tube so that only one tube is conducting at any given time except for brief intervals during which current flow transfers from one to the other tube. By making the grid resistors 26, 28 and the cross coupling capacitors 30, 32 of unequal value, such a multivibrator circuit can be arranged to generate an unsymmetrical rectangular wave form, such as the wave form shown on line A of Fig. 3. For the sake of concreteness, it will be assumed that the multivibrator circuit is arranged so that relatively short negative pulses appear at the anode 38 of the right hand tube 24, i. e., the waveform of line A, Fig. 3. Simultaneously, an inverted replica of this wave, as shown on line B, Fig. 3, will appear at the cathode 36 of the tube 24, and at the anode 34 of the other tube 22. These rectangular wave forms are utilized in the step wave circuit 10 as explained hereinafter.

Following the multivibrator circuit, there is provided a so-called "free running blocking oscillator," comprising a tube 42 having a coupling transformer 44 providing regenerative feedback between the anode 46 and the grid 48 of the tube 42. Coupling is provided between the cathode 50 of the oscillator tube 42 and the cathode 36 of the right hand multivibrator tube 24. With this arrangement, a positive pulse will be applied to the blocking oscillator cathode 50 once during each cycle of the multivibrator output to cut off the blocking oscillator 42 temporarily. The purpose of this cut off action will be explained shortly.

The blocking oscillator output comprises a series of steep pulses generated during each interval of the blocking oscillator operation. For simplicity, these pulses are shown as a simple sine wave in Fig. 3, line C. The operating frequency of the oscillator is variable by means of a variable resistor 52 in the oscillator grid circuit. The pulse wave form the blocking oscillator is applied through a cathode follower 54 to a capacitor step charging circuit.

The step charging circuit comprises a capacitor 58, connected to the cathode follower circuit 54 through one section (for reference purposes, the "left" section) of a dual diode tube 60 and through a transfer capacitor 59. The other section of the tube 60 is connected in inverse polarity relation to the cathode follower 54 through the transfer capacitor 59. Pulses of one polarity from the cathode follower 54 will be effective to charge the capacitor 58, while pulses of the opposite polarity will be shunted around the capacitor 58 through the other section of the diode tube 60, and will remove any charge developed on the transfer capacitor 59. In this way, a charge will be built up in incremental or stepwise fashion on the capacitor 58.

In order to discharge the capacitor 58 in preparation for another charging cycle, a discharging circuit is provided comprising a diode tube 70 and the cathode resistor 66 of a normally conducting tube 64. As long as current flows through the tube 64, positive voltage will be developed at the diode cathode 68, preventing current flow through the diode 70. However, if the current through the tube 64 is cut off, then the diode cathode 68 effectively will drop to ground potential, allowing the capacitor 58 to discharge through the diode 70. In order to cut off the tube 64, negative pulses are supplied from the multivibrator circuit to the tube 64.

Thus, during the relatively long portion of each multivibrator cycle, pulses from the blocking oscillator will build up a charge step-wise on the capacitor 58. During the short portion of the multivibrator cycle, the blocking oscillator will be cut off, and the capacitor will discharge. A stepwave such as shown in Fig. 3, line D, will appear across the capacitor 58.

The stepwave voltage from the capacitor 58 is applied to an isolating cathode follower circuit 74. Following the cathode follower 74, there is provided an amplifier tube 76 connected to provide a dual output. The cathode output of the tube 76 is applied through a second cathode follower 78 to provide the output signal from the stepwave generator 10. The second or anode output of the tube 76 is applied to a tube 80 which has a cathode load resistor 81 connected to the anode 63 in the right hand section of the dual tube 60. The purpose of this is to linearize the step charging action of the step charge circuit. As the voltage across the capacitor 58 builds up, the voltage at the anode of the right hand diode section becomes increasingly positive, thereby insuring that equal increments of voltage will be applied to the capacitor 58 by each successive pulse from the blocking oscillator circuit.

At the output of the step wave generator 10 there is provided a pair of terminals 82, 84 adapted to be connected to the input of an amplifier 12 to be tested. Preferably, the output circuit of the stepwave generator also includes a switch 86 which is used for system calibration as explained hereinafter.

A second pair of terminals 88, 90 is provided for connection to the output of the amplifier 12 being tested. These terminals 88, 90 are connected to a differentiator circuit 14, preferably through a second switch 92 which is also provided for calibration purposes.

The basic elements of the differentiator 14 comprise a serially connected capacitor 94 and resistor 96. As the amplified stepwave from the amplifier 12 appears at the input terminals 88, 90, a pulse of charging current will flow through the resistor 96 into the capacitor 94 at the beginning of each step of the stepwave. This pulse of current will provide a voltage pulse of amplitude determined by the corresponding step height. If desired, a rectifier element 98 can be connected in parallel with the resistor 96 to eliminate or limit the amplitude of the large negative polarity pulse which otherwise will appear at the end of each stepwave cycle.

Following the differentiator 14, there is provided a conventional amplifier 16 for amplifying the differentiated pulses appearing across the differentiator resistor 96.

In the embodiment of the invention shown in Fig. 2, the measuring means 18 comprises a cathode ray oscilloscope. Since oscilloscopes are well known per se, only such elements thereof are shown as are necessary for an understanding of the invention.

The oscilloscope includes a cathode ray tube 100 having horizontal deflection plates 102 and vertical deflection plates 104. The vertical deflection plates are supplied with the amplified voltage pulses from the amplifier 16, and the horizontal deflection plates 102 are supplied with a conventional sawtooth sweep voltage from a sweep generator circuit 106. In order that the sweep generator operation can be synchronized to that of the stepwave generator 10, a synchronizing pulse is supplied from the multivibrator tube 22 to the sweep generator 106. Thus, each sweep of the cathode ray beam will correspond to one complete stepwave from the generator 10. During each such sweep, the amplified pulses from the amplifier 16 will appear on the oscilloscope screen to provide the desired indications of amplifier response.

As was previously mentioned, the stepwave generator output and the differentiator input preferably include switches 86, 92. For calibration purposes, the switches 86, 92 would be positioned to couple the stepwave output directly to the differentiator input. The measuring means 18 then would be suitably indexed in terms of pulse height as far as pulses from the generator 10 are concerned, so that the effect of the amplifier 12 on the stepwave will be clear when the amplifier 12 is connected into the circuit.

From the foregoing, it can be seen that the present invention provides a simple and efficient system for checking amplifier linearity.

What is claimed is:

1. Apparatus for determining the effect of a signal transfer circuit on the amplitude of signals passed therethrough, said apparatus comprising a stepwave voltage generator, a differentiating network, means to connect said network to said generator through said circuit to convert stepwaves passed through said circuit into trains of voltage pulses, means connected to said network to amplify said pulses, and means connected to said amplifying means to indicate the comparative amplitudes of said pulses.

2. Apparatus for determining the amplitude response characteristics of a signal transfer circuit having an input and an output section, said apparatus comprising a source of varying voltage of recurring stepwave form, means to apply recurring stepwaves from said source to said circuit input section, a differentiating network, means to connect said differentiating network to said circuit output section, a cathode ray tube having two pairs of orthogonally related beam deflection plates, an amplifier connecting said network to one of said pairs of plates, and a source of voltage connected to the other pair of plates to apply to said other plate pair a recurring beam deflection voltage of recurrence rate equal to that of said stepwave.

3. Apparatus for determining the effect of a signal transfer circuit on the amplitude of individual portions of a signal passed through said circuit, said apparatus comprising a stepwave voltage generator, a differentiating network, means to connect said network to said generator through said circuit to derive a voltage pulse from each step in the stepwaves applied to said circuit, and means connected to said network to measure the individual amplitude of each said pulse.

4. In a system for determining the response of an amplifier to signals of differing amplitude, the combination of a step-wave voltage generator, a differentiating circuit, means to connect an amplifier to be tested between said generator and said circuit, and means connected to said differentiating circuit to measure the relative amplitudes of voltage pulses generated therein in response to the application of a stepwave thereto.

5. Amplifier response measuring apparatus comprising a first circuit for generating a repetitive step-shaped voltage, a second circuit for converting said step-shaped voltage to voltage pulses each corresponding to one of the steps in said step shaped voltage, measuring means connected to said second circuit to measure the amplitude of said voltage pulses, and means to connect an amplifier to be tested between said first and said second circuits.

6. An apparatus for generating voltage pulses representative of the response of an amplifier to signals of different amplitude supplied to said amplifier, said apparatus comprising the combination of a stepwave voltage generator having a pair of output terminals adapted to be connected to the input of an amplifier being tested to apply step wave voltage to said amplifier, a pair of input terminals adapted to be connected to the output of said amplifier being tested, a resistor and a capacitor serially connected between said input terminals to convert step wave voltage applied to said input terminals into voltage pulses across said resistor, each said voltage pulse corresponding to one of the steps in said step wave voltage.

BARRY C. KING, Jr.

References Cited in the file of this patent

Beck et al., Proc. of the I. R. E., vol. 35, No. 11, November 1947, pages 1226–1230.

Samuel et al., Proc. of the I. R. E., vol. 36, No. 11, November 1948, pages 1414–1418.